United States Patent
Hibino

(10) Patent No.: US 9,754,741 B2
(45) Date of Patent: Sep. 5, 2017

(54) ASSEMBLED STRUCTURE AND ELECTRONIC DEVICE INCLUDING SAME

(71) Applicant: KYOCERA CORPORATION, Kyoto (JP)

(72) Inventor: Kouta Hibino, Shijonawate (JP)

(73) Assignee: KYOCERA CORPORATION, Kyoto (JP)

( * ) Notice: Subject to any disclaimer, the term of this patent is extended or adjusted under 35 U.S.C. 154(b) by 43 days.

(21) Appl. No.: 14/926,911

(22) Filed: Oct. 29, 2015

(65) Prior Publication Data
US 2016/0126033 A1 May 5, 2016

(30) Foreign Application Priority Data
Oct. 29, 2014 (JP) ................. 2014-220180

(51) Int. Cl.
*G06F 1/18* (2006.01)
*H01H 13/88* (2006.01)

(52) U.S. Cl.
CPC ............. *H01H 13/88* (2013.01); *G06F 1/18* (2013.01); *H01H 2229/022* (2013.01); *H01H 2229/042* (2013.01); *H01H 2229/048* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,418,282 | B2 * | 8/2008 | Nuovo | H04M 1/23 361/814 |
| 7,711,400 | B2 * | 5/2010 | Nuovo | H01H 13/70 455/575.8 |
| 7,889,498 | B2 * | 2/2011 | Diebel | G06F 1/1628 361/679.41 |
| 8,457,701 | B2 * | 6/2013 | Diebel | H04B 1/3888 206/701 |
| 8,693,171 | B2 * | 4/2014 | Bureau | A44C 17/02 361/679.01 |
| 8,988,886 | B1 * | 3/2015 | Arao | G06F 1/1656 361/679.01 |
| 9,001,503 | B1 * | 4/2015 | Hibino | H05K 1/0306 361/679.01 |
| 9,114,487 | B2 * | 8/2015 | Kiple | B23P 11/00 |
| 9,185,813 | B2 * | 11/2015 | Diebel | H04B 1/3888 |
| 9,354,665 | B2 * | 5/2016 | Arao | G06F 1/1656 |
| 9,460,643 | B2 * | 10/2016 | Hirakata | H01L 51/0097 |

(Continued)

FOREIGN PATENT DOCUMENTS

JP 2008-113101 A 5/2008

*Primary Examiner* — Lisa Lea Edmonds
(74) *Attorney, Agent, or Firm* — Duane Morris LLP

(57) ABSTRACT

An assembled structure includes a metal plate having a first main surface and a second main surface, and having a through hole, as well as a resin member assembled with the metal plate and disposed on the second main surface side so as to have a portion fitted within the through hole. Assuming that an opening when the through hole is viewed in a plan view has a first width at a point along the opening and a second width measured in parallel to the first width at a point shifted toward the outer side of the opening, a combination of the first width and the second width can be determined such that the second width is larger than the first width.

11 Claims, 13 Drawing Sheets

(56) References Cited

U.S. PATENT DOCUMENTS

| | | | | |
|---|---|---|---|---|
| 2004/0102230 | A1* | 5/2004 | Nuovo | H01H 13/70 455/575.1 |
| 2010/0315765 | A1* | 12/2010 | Bureau | A44C 17/02 361/679.01 |
| 2011/0309728 | A1* | 12/2011 | Diebel | H04B 1/3888 312/293.1 |
| 2013/0265703 | A1* | 10/2013 | Diebel | H04B 1/3888 361/679.01 |
| 2014/0321052 | A1* | 10/2014 | Diebel | G06F 1/1628 361/679.56 |
| 2015/0062927 | A1* | 3/2015 | Hirakata | H01L 51/0097 362/362 |
| 2015/0181736 | A1* | 6/2015 | Hibino | H05K 1/0306 361/752 |
| 2015/0241928 | A1* | 8/2015 | Arao | G06F 1/1656 361/679.26 |
| 2015/0351273 | A1* | 12/2015 | Kiple | B23P 11/00 343/702 |
| 2016/0056856 | A1* | 2/2016 | Diebel | H04B 1/3888 264/250 |

* cited by examiner

ASSEMBLED STRUCTURE AND ELECTRONIC DEVICE INCLUDING SAME

CROSS-REFERENCE TO RELATED APPLICATION

The present application claims priority under 35 U.S.C. §119 to Japanese Patent Application No. 2014-220180, filed on Oct. 29, 2014, entitled "Assembled Structure and Electronic Device Including the Same." The content of which is incorporated by reference herein in its entirety.

FIELD

The present disclosure relates to an assembled structure and an electronic device including the same.

BACKGROUND

In recent years, slimming down of electronic devices, such as portable terminals, is being required. When slimming down of a housing progresses, rigidity becomes insufficient.

SUMMARY

The present disclosure has an object to provide a novel assembled structure and a novel electronic device.

The assembled structure based on the present disclosure includes a metal plate having a first main surface and a second main surface, and having a connection reinforcing opening as a through hole, as well as a resin member assembled with the metal plate. The resin member includes a base portion extending from at least a part of a projection area of the connection reinforcing opening to an area adjacent to the projection area along the second main surface, and a connection reinforcing projection protruding from the base portion, and directed from the second main surface side to the first main surface side to be fitted within the connection reinforcing opening. The shape of the connection reinforcing opening viewed in a plan view includes an anchor shape in which a first width at a position shifted by a first distance from a centroid of the shape of the connection reinforcing opening viewed in a plan view toward a first side is smaller than a second width at a position away from the centroid toward the first side by a second distance, which is longer than the first distance.

The foregoing and other objects, features, aspects and advantages of the present disclosure will become more apparent from the following detailed description of the present disclosure when taken in conjunction with the accompanying drawings.

DETAILED DESCRIPTION (First Embodiment)

Figure 1:
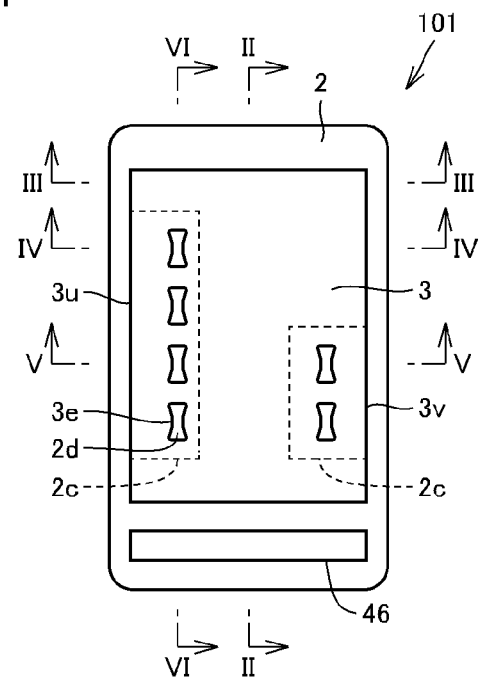
FIG. 1 is a plan view of an assembled structure according to a first embodiment based on the present disclosure.
Figure 2:
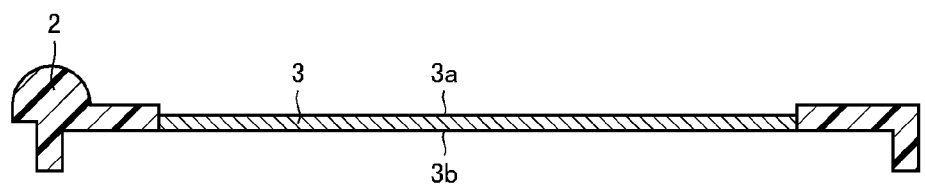
FIG. 2 is a cross sectional view taken along the line II-II in FIG. 1.
Figure 3:
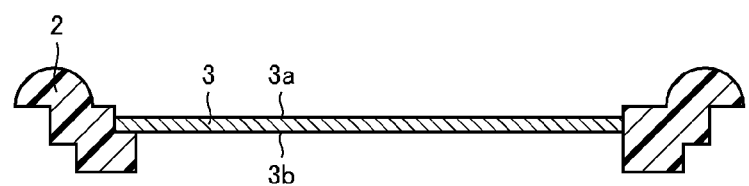
FIG. 3 is a cross sectional view taken along the line III-III in FIG. 1.
Figure 4:
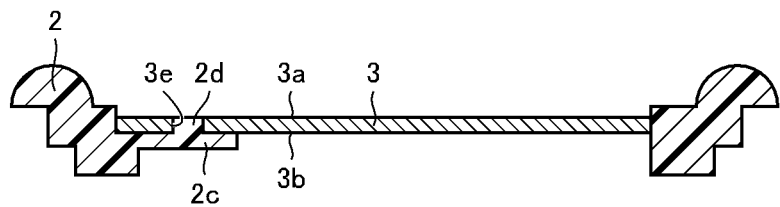
FIG. 4 is a cross sectional view taken along the line IV-IV in FIG. 1.
Figure 5:
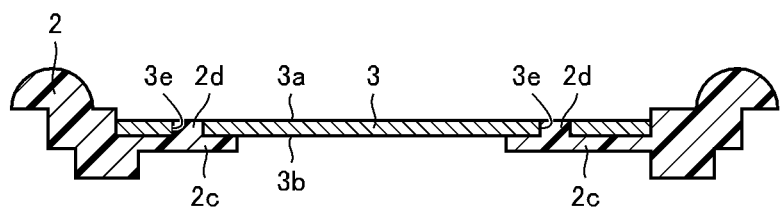
FIG. 5 is a cross sectional view taken along the line V-V in FIG. 1.
Figure 6:
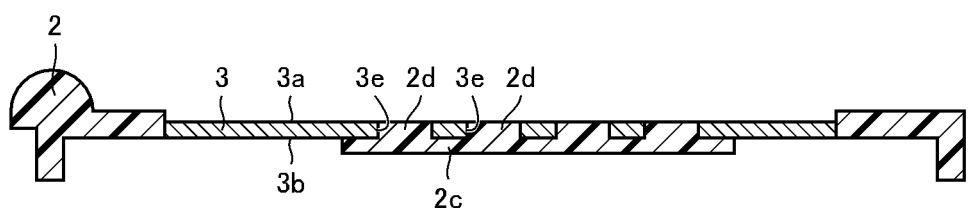
FIG. 6 is a cross sectional view taken along the line VI-VI in FIG. 1.

Referring to FIGS. 1 to 10, an assembled structure according to a first embodiment based on the present disclosure will be described. A plan view of an assembled structure 101 according to the first embodiment is shown in FIG. 1. Assembled structure 101 constitutes a part of a housing of a portable terminal. A cross sectional view taken along the line II-II in FIG. 1 is shown in FIG. 2. A cross sectional view taken along the line III-III in FIG. 1 is shown in FIG. 3. A cross sectional view taken along the line IV-IV in FIG. 1 is shown in FIG. 4. A cross sectional view taken along the line V-V in FIG. 1 is shown in FIG. 5. A cross sectional view taken along the line VI-VI in FIG. 1 is shown in FIG. 6.

As shown in FIG. 1, assembled structure 101 has a generally rectangular contour when viewed in a plan view. Assembled structure 101 is an assembly of a resin member 2 and a metal plate 3. Resin member 2 includes a portion that surrounds the outer periphery of generally rectangular metal plate 3. Several openings are provided in metal plate 3, and resin member 2 is exposed to the inside of at least some of these openings. Resin member 2 includes a portion that extends along a partial area on the back side of metal plate 3, as indicated by the broken line in FIG. 1. Description will be given below in more detail.

Assembled structure 101 according to the first embodiment includes metal plate 3 having a first main surface 3a and a second main surface 3b directed oppositely to first main surface 3a, and having a through hole, as well as resin member 2 assembled with metal plate 3 and disposed on the second main surface 3b side so as to have a portion fitted within the through hole. An opening when the through hole provided in metal plate 3 is viewed in a plan view will be hereinafter referred to as a "connection reinforcing opening."

Figure 7:
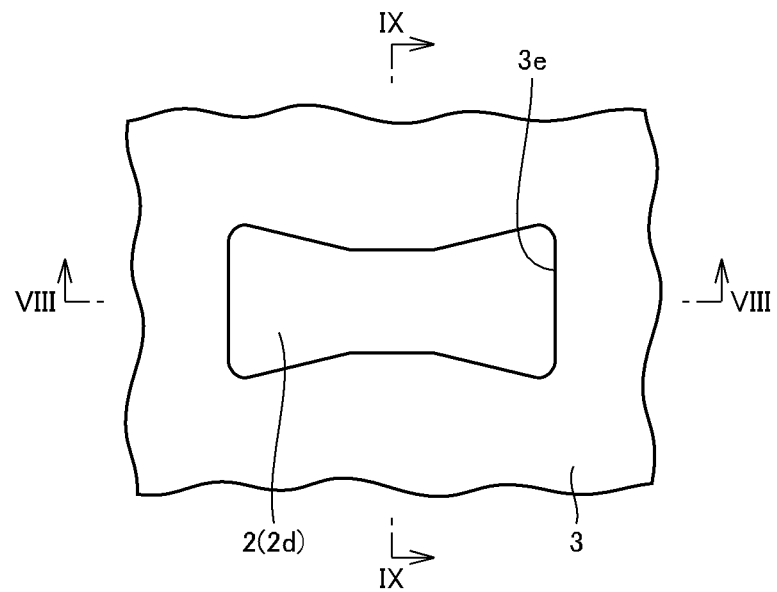
FIG. 7 is an enlarged view of a connection reinforcing opening that the assembled structure according to the first embodiment based on the present disclosure has.
Figure 8:
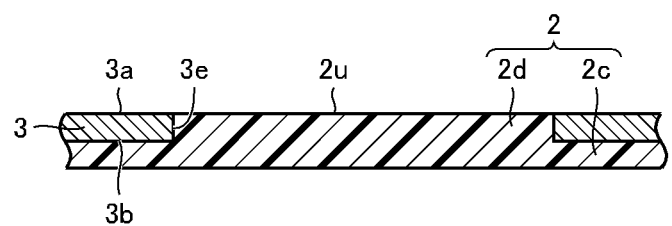
FIG. 8 is a cross sectional view taken along the line VIII-VIII in FIG. 7.
Figure 9:
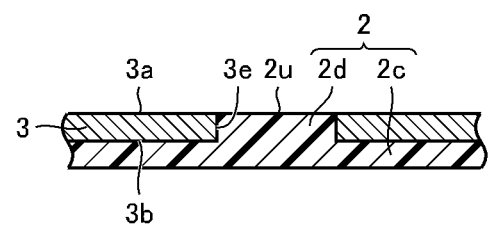
FIG. 9 is a cross sectional view taken along the line IX-IX in FIG. 7.

A plurality of connection reinforcing openings 3e are shown in FIG. 1, and FIG. 7 shows an enlarged view of one of them. A cross sectional view taken along the line VIII-VIII in FIG. 7 is shown in FIG. 8. A cross sectional view taken along the line IX-IX in FIG. 7 is shown in FIG. 9. Resin member 2 includes a base portion 2c extending from at least a part of a projection area of connection reinforcing opening 3e to an area adjacent to the projection area along second main surface 3b of metal plate 3, as well as a connection reinforcing projection 2d protruding from base portion 2c, and directed from the second main surface 3b side to the first main surface 3a side to be fitted within connection reinforcing opening 3e. As shown in FIGS. 8 and 9, a top surface 2u of connection reinforcing projection 2d is coplanar with first main surface 3a of metal plate 3.

In the first embodiment, assuming that an opening when the through hole of metal plate 3 is viewed in a plan view has a first width at a point along the opening and a second width measured in parallel to the first width at a point shifted toward the outer side of the opening, a combination of the first width and the second width can be determined such that the second width is larger than the first width. This will be specifically described below.

Figure 10:
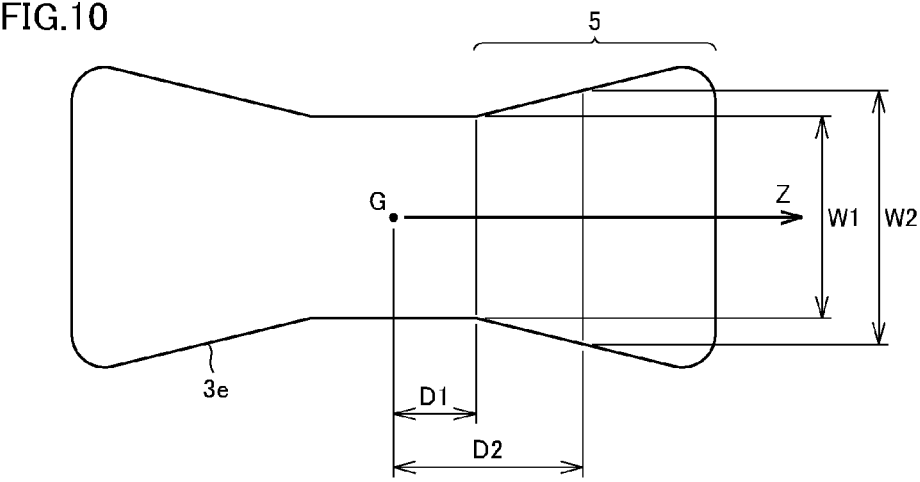
FIG. 10 is an explanatory drawing of the shape of the connection reinforcing opening that the assembled structure according to the first embodiment based on the present disclosure has.

An appearance of connection reinforcing opening 3e viewed in a plan view is shown in FIG. 10. Assuming a width at a point along connection reinforcing opening 3e as a first width W1, and a width measured in parallel to first width W1 at a point shifted toward the outer side of connection reinforcing opening 3e as a second width W2, the shape of connection reinforcing opening 3e includes an anchor shape in which second width W2 is larger than first width W1. In other words, the shape of connection reinforcing opening 3e viewed in a plan view includes an anchor shape 5 in which first width W1 at a position away from a centroid G of the shape of connection reinforcing opening 3e viewed in a plan view toward a first side Z by a first distance D1 is smaller than second width W2 at a position away from centroid G toward first side Z by a second distance D2, which is longer than first distance D1. In the example shown in FIG. 10, a trapezoidal portion on the right is anchor shape 5.

Although in the example shown in FIG. 10, the distance from centroid G of the shape of connection reinforcing opening 3e viewed in a plan view to the leftmost point of right-side anchor shape 5 where the width is smallest is assumed as D1, how to determine D1 and D2 is not limited to this. One or more combinations should only exist in which, when D1 and D2 are determined at appropriate positions in the shape of connection reinforcing opening 3e viewed in a plan view, the large and small relation as described above holds between the widths. The anchor shape is not limited to a trapezoidal shape. As the anchor shape, various variations are conceivable as will be described below.

An exemplary specific shape of the "anchor shape" has been described here with reference to FIG. 10. The "anchor shape" can also be described as follows. The "anchor shape" refers to a shape that, when a pulling force acts on a flat plate-like first member having an opening and a second member disposed so as to be at least partially fitted within the opening, in a surface direction of the first member, can produce an engaged relationship between the first and second members utilizing a part of the contour shape of the opening to transmit the pulling force between the first and second members while maintaining the relative positional relationship between the first and second members. In the example shown in the first embodiment, the first member is metal plate 3, and the second member is resin member 2.

In the example shown in FIG. 1, resin member 2 has an opening 46 where a button is to be disposed. Opening 46 is shown merely as an example, and the position, shape, number, and the like of opening 46 are not necessarily limited to them. A configuration in which resin member 2 does not have such opening 46 is also applicable.

In the first embodiment, the shape of connection reinforcing opening 3e viewed in a plan view includes the anchor shape. When a bending moment is exerted as indicated by an arrow 91 in FIG. 11, for example, the pulling force acting on metal plate 3 is transmitted to connection reinforcing projection 2d, because the first and second members have an engaged relationship by means of the anchor shape as indicated by an arrow 92 in FIG. 12. Detachment between metal plate 3 and resin member 2 can be prevented. This will be described below in detail.

Figure 11:
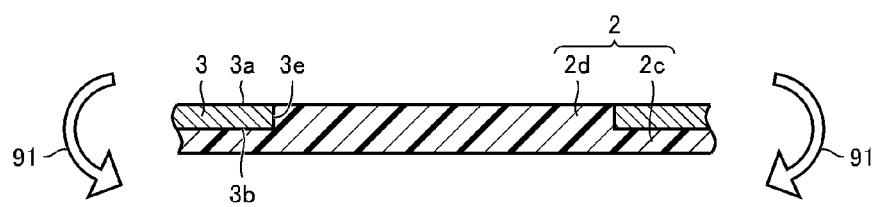
FIG. 11 is a first explanatory drawing of a state when a bending moment is exerted in the vicinity of the connection reinforcing opening that the assembled structure according to the first embodiment based on the present disclosure has.
Figure 12:
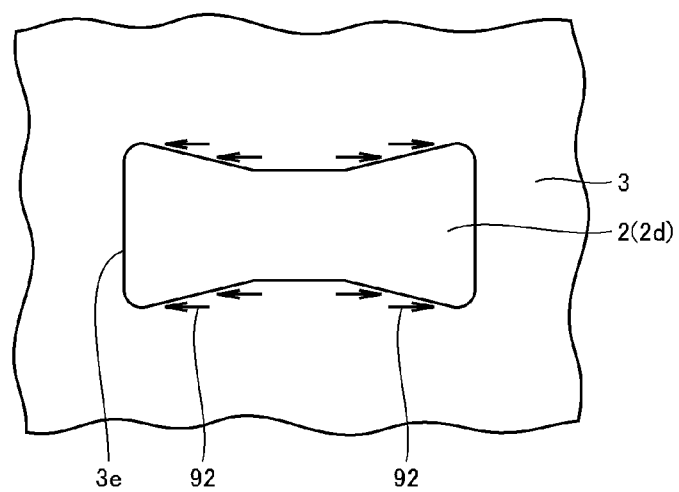
FIG. 12 is a second explanatory drawing of a state when a bending moment is exerted in the vicinity of the connection reinforcing opening that the assembled structure according to the first embodiment based on the present disclosure has.

When a bending is caused by an impact or an external force during use, the vicinity of connection reinforcing opening 3e is brought into the state as shown in FIG. 11. Paying attention to a certain moment, a bending moment will be exerted as indicated by arrow 91. By such a bending moment, a pulling force is exerted in the vicinity of the upper surface and a compressive force is exerted in the vicinity of the lower surface. Connection reinforcing opening 3e is filled with connection reinforcing projection 2d. At this time, a part of resin member 2 is exposed in a manner surrounded by metal plate 3 when viewed in a plan view, as shown in FIG. 12. The resin surface of a limited area is exposed in the state surrounded by the metal surface.

A portion where the side surfaces of connection reinforcing projection 2d and metal plate 3 are in contact with each other is small in area, where the bonding power itself is not very large. If connection reinforcing opening 3e is an opening of a simple shape such as rectangular or circular, and if this opening is only filled with a projection made of resin of an identical shape, when a pulling force is exerted by a bending moment to stretch metal plate 3, resin member 2 in the opening may not be able to follow the stretch, resulting in detachment between the inner peripheral surface of the opening of the metal plate and the outer peripheral surface of the projection. When such detachment occurs, detachment may further grow in the neighborhood starting from the detached point.

In the first embodiment, the shape of connection reinforcing opening 3e viewed in a plan view includes the anchor shape as shown in FIG. 12, and resin member 2 protrudes as connection reinforcing projection 2d so as to fill the area of this anchor shape.

When the upper surface shown in FIG. 12, namely, the surface closer to a viewer of the drawing is pulled in the horizontal direction under the action of a bending moment, a force is exerted from metal plate 3 to resin member 2 as indicated by arrow 92 by the presence of the anchor shape. Metal plate 3 not only attempts to be stretched in advance by a bending moment, but also brings together and pulls resin member 2 as indicated by arrow 92. In other words, metal plate 3 attempts to be stretched while holding the anchor shape portion of resin member 2. When metal plate 3 attempts to be stretched, resin member 2 will also be stretched, which can prevent the inner peripheral surface of the opening of the metal plate from being detached from the outer peripheral surface of the projection. Growth of detachment to the neighborhood can also be prevented.

The first embodiment can thus achieve an assembled structure that is less likely to cause a failure, such as detachment, even if it is subjected to an impact or a bending by an external force. Such an assembly of connection reinforcing opening 3e and connection reinforcing projection 2d only needs to be disposed such that an appropriate direction is the longitudinal direction to accommodate a possible bending.

As shown in FIG. 10, connection reinforcing opening 3e preferably has two sides tapering to flare toward the outer side of connection reinforcing opening 3e. In other words, anchor shape 5 preferably has two sides tapering to flare from centroid G toward first side Z. With this configuration, metal plate 3 and resin member 2 can be engaged with each other over the entire section of these two sides, so that a pulling force can be smoothly transferred from metal plate 3 to resin member 2.

In the first embodiment, top surface 2u of connection reinforcing projection 2d shall be coplanar with first main surface 3a as shown in FIGS. 8 and 9, but this is not indispensable. Top surface 2u may be higher or lower than first main surface 3a. However, if top surface 2u is higher than first main surface 3a, it may be obstructive when placing other components on first main surface 3a. If top surface 2u is lower than first main surface 3a, the portion where the side surface of connection reinforcing projection 2d and the inner surface of connection reinforcing opening 3e are engaged with each other will become smaller, which may reduce the connection reinforcing effect. When top surface 2u is coplanar with first main surface 3a, there is no portion protruding from first main surface 3a while ensuring a sufficient connection reinforcing effect, which is most preferable.

Metal plate 3 and resin member 2 are preferably assembled together by insert molding. Even when assembling the both materials by another method different from insert molding, a similar configuration can be implemented, and a certain effect can also be attained in such a case. By adopting insert molding, however, the configuration in which metal and resin are closely fitted together as shown in the first embodiment can be easily achieved.

Figure 13:
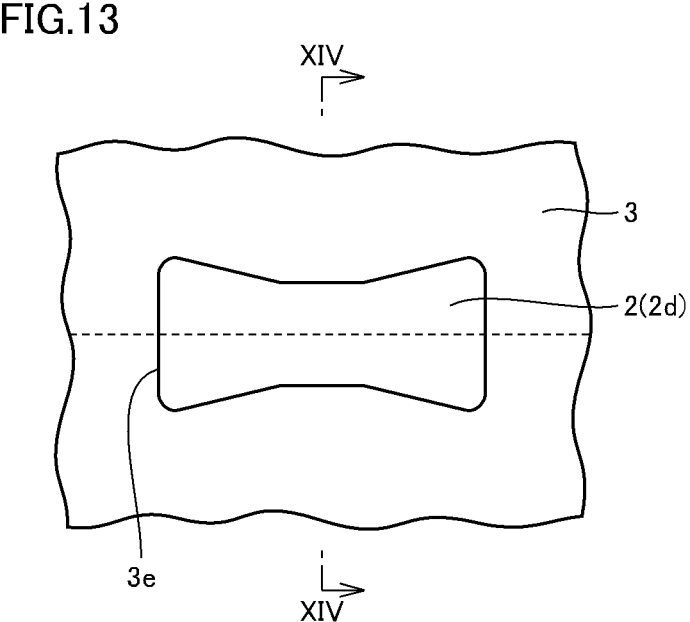
FIG. 13 is an enlarged view of a connection reinforcing opening that a variation of the assembled structure according to the first embodiment based on the present disclosure has.
Figure 14:
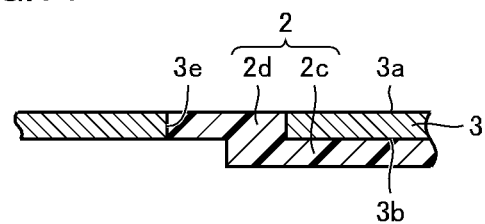
FIG. 14 is a cross sectional view taken along the line XIV-XIV in FIG. 13.

The first embodiment has shown the example in which base portion 2c of resin member 2 extends all over the projection area of connection reinforcing opening 3e, as shown in FIGS. 7 to 9. In other words, the example in which base portion 2c is present all over connection reinforcing opening 3e has been shown. However, base portion 2c does not always extend all over the projection area of connection reinforcing opening 3e in this manner, but may be configured to extend only partially. For example, the configuration as shown in FIGS. 13 and 14 is applicable. FIG. 14 is a cross sectional view taken along the line XIV-XIV in FIG. 13. In this example, base portion 2c extends only in the half of the projection area of connection reinforcing opening 3e. Base portion 2c extends along second main surface 3b of metal plate 3 in the area below the broken line in FIG. 13, but does not extend in the area above the broken line. Such a configuration in which base portion 2c extends only partially in the projection area of connection reinforcing opening 3e may be adopted when the volume of resin member 2 is to be reduced as much as possible, or when the area in which base portion 2c of resin member 2 extends is to be reduced as much as possible.

The first embodiment has described that assembled structure 101 is generally rectangular as a whole when viewed in a plan view. Metal plate 3 has also been described as being generally rectangular. Preferably, metal plate 3 has a shape whose longitudinal direction can be specified when viewed in a plan view, and the longitudinal direction of the shape of connection reinforcing opening 3e when viewed in a plan view is in parallel to the longitudinal direction of metal plate 3. In the first embodiment, with reference to FIG. 1, for example, metal plate 3 obviously has its longitudinal direction running in the upward/downward direction in the drawing. The longitudinal direction of metal plate 3 can be specified in this manner. Connection reinforcing opening 3e also has its longitudinal direction running in the upward/downward direction in FIG. 1. In the example shown in FIG. 1, the longitudinal direction of the shape of connection reinforcing opening 3e when viewed in a plan view is in parallel to the longitudinal direction of metal plate 3. Since a bending occurring in metal plate 3 at the time of an impact or in use is generally likely to occur particularly in the longitudinal direction, the effect of preventing detachment by means of the assembly of connection reinforcing opening 3e and connection reinforcing projection 2d can function efficiently provided that the longitudinal direction of the shape of connection reinforcing opening 3e when viewed in a plan view is in parallel to the longitudinal direction of metal plate 3.

Connection reinforcing opening 3e is preferably disposed along any one of the sides that constitute the contour of metal plate 3 when viewed in a plan view. In FIG. 1, six connection reinforcing openings 3e are depicted as an example, each of which is disposed so as to satisfy this condition. In the example shown in FIG. 1, four connection reinforcing openings 3e on the left are disposed along a side 3u of metal plate 3, and two connection reinforcing openings 3e on the right are disposed along a side 3v of metal plate 3. If connection reinforcing openings 3e are disposed along any one of the sides that constitute the contour of metal plate 3 as described above, the area in which base portion 2c of resin member 2 extends can be saved. As a matter of course, it is not necessarily the case that all of plurality of connection reinforcing openings 3e should extend along any side of metal plate 3 in this manner, but plurality of connection reinforcing openings 3e may include some connection reinforcing openings 3e disposed not to extend along any side.

In the example shown in FIG. 1, only a single row of connection reinforcing openings 3e is disposed along each of sides 3u and 3v, but two or more rows of connection reinforcing openings 3e may be disposed in parallel along one side.

The first embodiment has described the configuration in which plurality of connection reinforcing openings 3e are provided in one metal plate 3, and different connection reinforcing projection 2d is fitted within each of connection reinforcing openings 3e as shown in FIG. 1, but it is not indispensable that one assembled structure includes a plurality of combinations of connection reinforcing opening 3e and connection reinforcing projection 2d in this manner. Even if only one combination of connection reinforcing opening 3e and connection reinforcing projection 2d is included, a certain degree of effect can be attained. However, in order to effectively prevent detachment between the metal plate and the resin member, one assembled structure 101 preferably includes a plurality of combinations of connection reinforcing opening 3e and connection reinforcing projection 2d, as shown in FIG. 1.

FIGS. 1 to 14 illustrate a constant shape as the planar shape of connection reinforcing opening 3e. In this shape, the both ends in the longitudinal direction are generally trapezoidal as anchor shape 5, each having a width increasing as a tapering shape toward the outer side. These two generally trapezoidal portions are coupled by a rectangular portion. However, the shape of connection reinforcing opening 3e shown here is merely an example, and other various shapes are conceivable.

Some examples of the other conceivable shapes will be described below as second to seventh embodiments. The second to seventh embodiments have connection reinforcing openings of different shapes, which will each be described in detail paying attention to the shape of the connection reinforcing opening. The overall configuration as an assembled structure of each of the second to seventh embodiments is basically similar to that of the first embodiment, and description thereof will not be repeated here.

(Second Embodiment)

Figure 15:
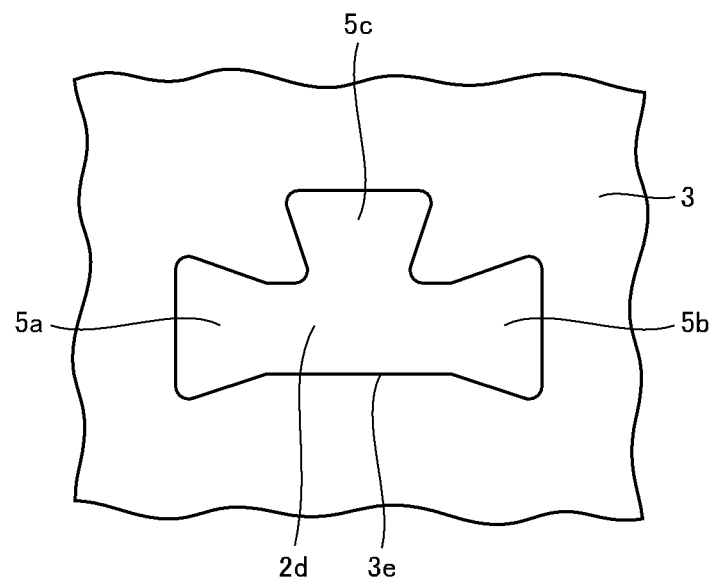
FIG. 15 is an enlarged plan view of the vicinity of a connection reinforcing opening that an assembled structure according to a second embodiment based on the present disclosure has.

As shown in FIG. 15, for example, connection reinforcing opening 3e may have another anchor shape 5c branched in a direction different from a linear portion connecting two anchor shapes 5a and 5b. In the example shown in FIG. 15, connection reinforcing opening 3e has a generally T-shape as a whole. It can be said that this connection reinforcing opening 3e includes at least three anchor shapes.

(Third Embodiment)

Figure 16:
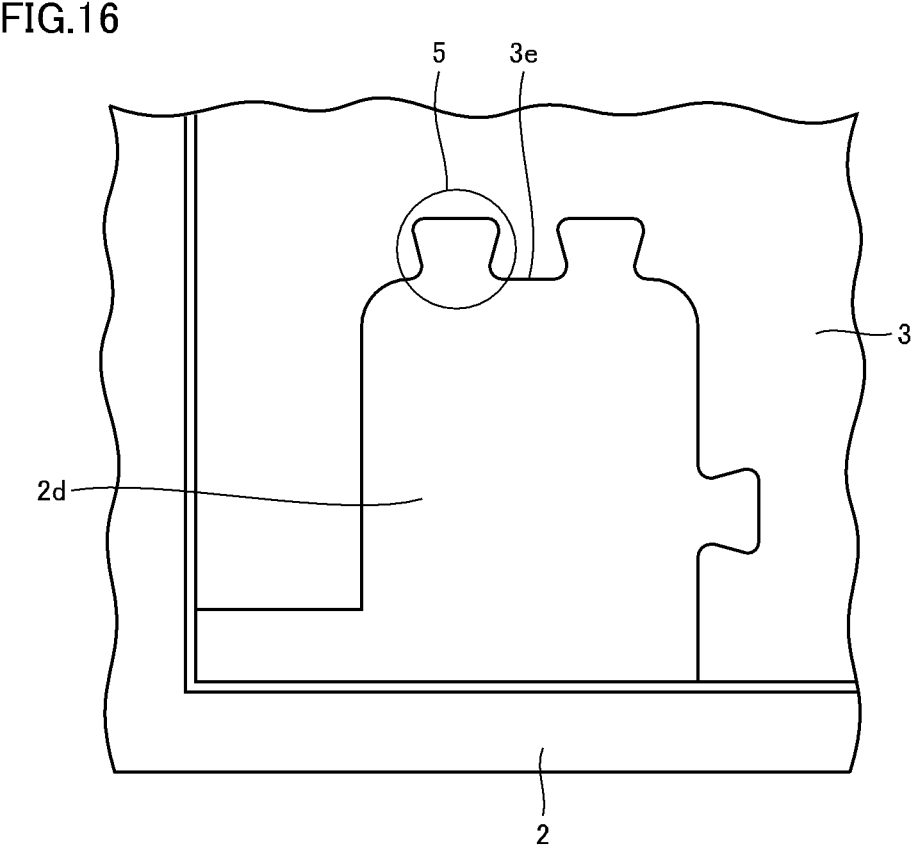
FIG. 16 is an enlarged plan view of the vicinity of a connection reinforcing opening that an assembled structure according to a third embodiment based on the present disclosure has.

As shown in FIG. 16, a shape having one or more portions of anchor shape 5 extending outward from the basic figure that occupies a large area is also applicable. In the example shown in FIG. 16, generally trapezoidal three anchor shapes 5 are provided for one connection reinforcing opening 3e. In this example, connection reinforcing opening 3e is provided at a position near the corner of metal plate 3, so that resin member 2 is visible. In this manner, connection reinforcing opening 3e may be in contact with the contour line of metal plate 3.

However, it is not necessarily the case that connection reinforcing opening 3e of the shape as shown in the third embodiment can only be employed in the vicinity of an end or at a corner of metal plate 3, but such connection reinforcing opening 3e may be provided at a position away from the contour line of metal plate 3. The number of anchor shapes 5 provided for one connection reinforcing opening 3e may be other than three.

(Fourth Embodiment)

Figure 17:
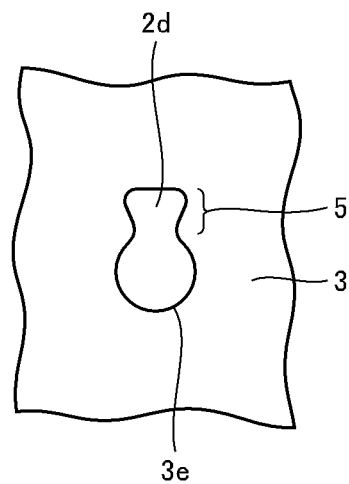
FIG. 17 is an enlarged plan view of the vicinity of a connection reinforcing opening that an assembled structure according to a fourth embodiment based on the present disclosure has.

As shown in FIG. 17, connection reinforcing opening 3e may have such a shape that generally trapezoidal anchor shape 5 extends from a generally circular portion. In the example shown in FIG. 17, connection reinforcing opening 3e presents a keyhole-like shape. Although the shape in which one anchor shape 5 protrudes from one generally circular portion has been illustrated here as an example of connection reinforcing opening 3e, a shape in which a plurality of anchor shapes protrude from one generally circular portion in directions different from one another is also applicable.

(Fifth Embodiment)

Figure 18:
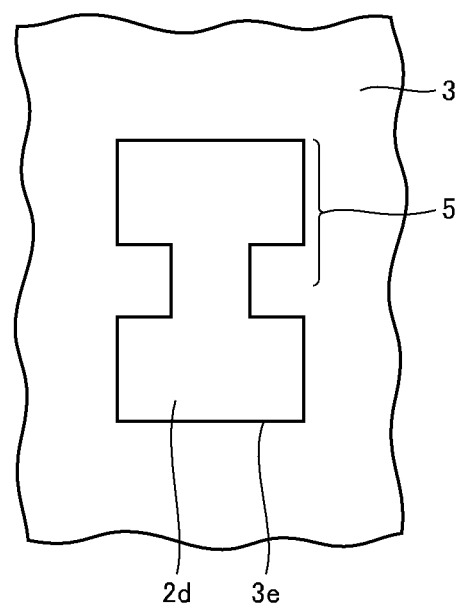
FIG. 18 is an enlarged plan view of the vicinity of a connection reinforcing opening that an assembled structure according to a fifth embodiment based on the present disclosure has.

The anchor shape is not limited to the generally trapezoidal shape, but may be another shape. An example of connection reinforcing opening 3e including an anchor shape other than a generally trapezoidal shape is shown in FIG. 18. In this example, the anchor shape is a T-shape. Connection reinforcing opening 3e is formed by combining two T-shape portions to each other in opposite directions. The effect can be attained even with such a configuration.

(Sixth Embodiment)

Figure 19:
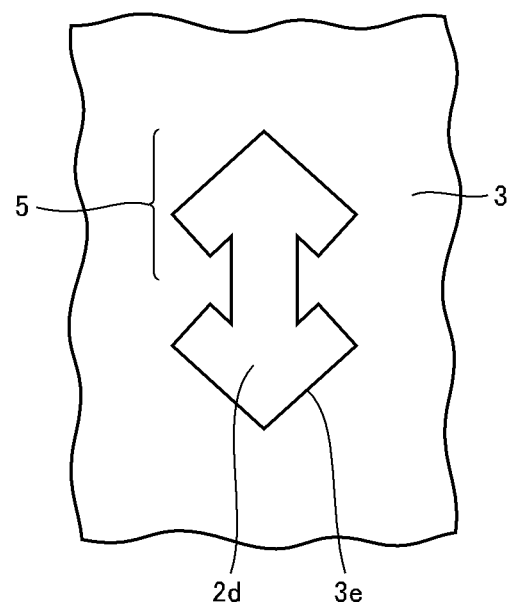
FIG. 19 is an enlarged plan view of the vicinity of a connection reinforcing opening that an assembled structure according to a sixth embodiment based on the present disclosure has.
Figure 20:
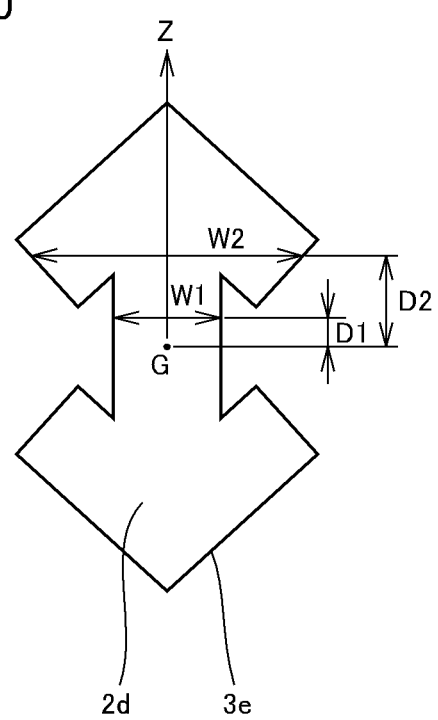
FIG. 20 is an explanatory drawing of the shape of the connection reinforcing opening that the assembled structure according to the sixth embodiment based on the present disclosure has.

Still another example of connection reinforcing opening 3e is shown in FIG. 19. In this example, it can be considered that the upper half of connection reinforcing opening 3e presents one anchor shape, and the lower half presents the other anchor shape. This example will be verified in detail with reference to FIG. 20. FIG. 20 shows connection reinforcing opening 3e enlarged. As shown in FIG. 20 as an example, first side Z is determined. The shape of connection reinforcing opening 3e viewed in a plan view includes an anchor shape in which first width W1 at a position away from centroid G of the shape of connection reinforcing opening 3e viewed in a plan view toward first side Z by first distance D1 is smaller than second width W2 at a position away from centroid G toward first side Z by second distance D2, which is longer than first distance D1. In this case, the condition of the anchor shape described in the first embodiment is also satisfied. The effect can be attained even with such a configuration.

Particularly when the contour of connection reinforcing opening 3e has a complicated shape as shown in FIG. 19, the shape can function effectively against growth or compression not only in the upward and downward directions in the drawing but also in various directions. Detachment between the metal plate and the resin member can be prevented more effectively.

(Seventh Embodiment)

Figure 21:
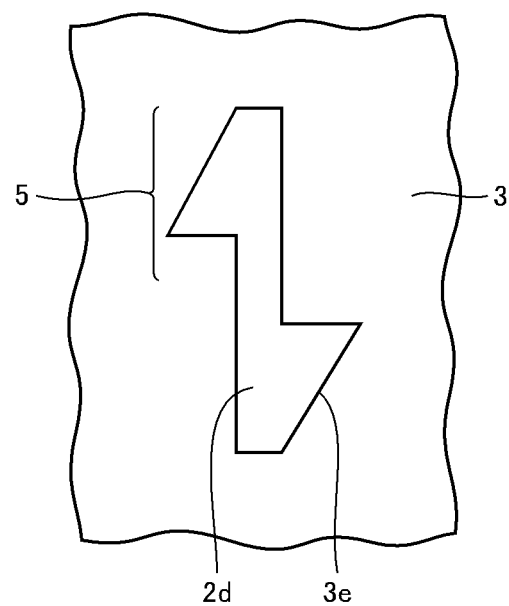
FIG. 21 is an enlarged plan view of the vicinity of a connection reinforcing opening that an assembled structure according to a seventh embodiment based on the present disclosure has.
Figure 22:
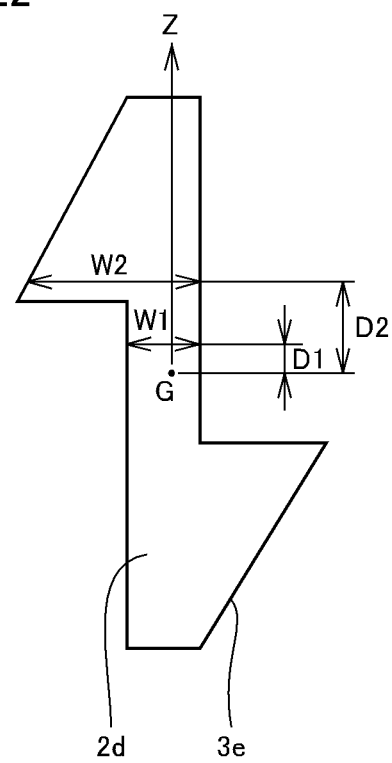
FIG. 22 is an explanatory drawing of the shape of the connection reinforcing opening that the assembled structure according to the seventh embodiment based on the present disclosure has.

Still another example of connection reinforcing opening $3e$ is shown in FIG. 21. In this example, it can be considered that the upper half of connection reinforcing opening $3e$ presents one anchor shape, and the lower half presents the other anchor shape. This example will be verified in detail with reference to FIG. 22. FIG. 22 shows connection reinforcing opening $3e$ enlarged. As shown in FIG. 22 as an example, first side Z is determined. The shape of connection reinforcing opening $3e$ viewed in a plan view includes an anchor shape in which first width W1 at a position away from centroid G of the shape of connection reinforcing opening $3e$ viewed in a plan view toward first side Z by first distance D1 is smaller than second width W2 at a position away from centroid G toward first side Z by second distance D2, which is longer than first distance D1. In this case, the condition of the anchor shape described in the first embodiment is also satisfied. The effect can be attained even with such a configuration.

(Eighth Embodiment)

Figure 23:
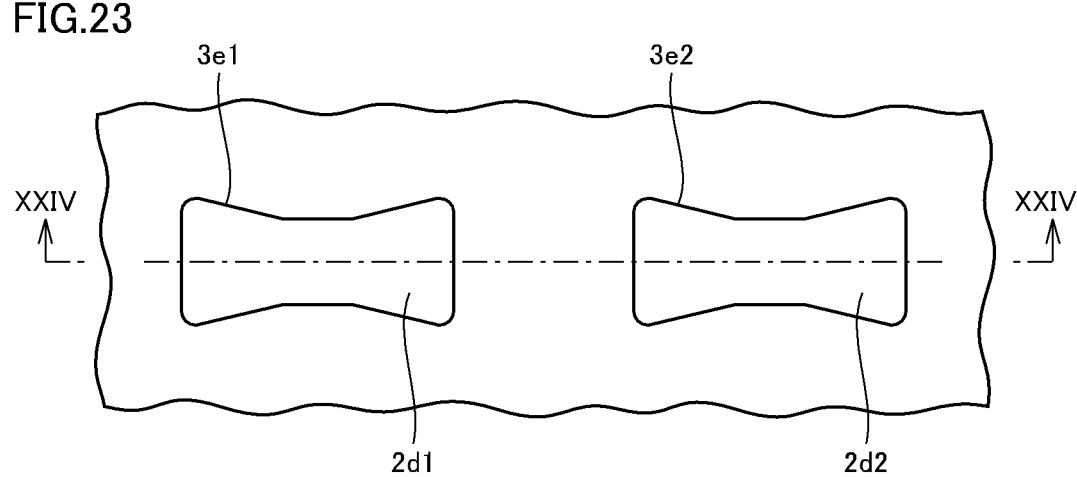
FIG. 23 is an enlarged plan view of the vicinity of a row of connection reinforcing openings that an assembled structure according to an eighth embodiment based on the present disclosure has.
Figure 24:
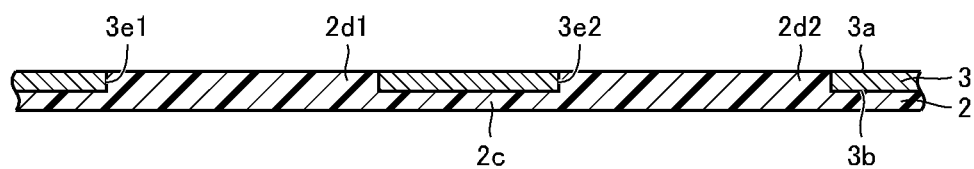
FIG. 24 is a cross sectional view taken along the line XXIV-XXIV in FIG. 23.

Referring to FIGS. 1, 23 and 24, an assembled structure according to an eighth embodiment based on the present disclosure will be described. In the eighth embodiment, the overall configuration as an assembled structure is basically similar to that of the first embodiment, and will not be described repeatedly. Although assembled structure 101 illustrated in the first embodiment already has the configuration which will be described in the eighth embodiment, the configuration will be re-described in the eighth embodiment for clarity.

The assembled structure according to the eighth embodiment includes a plurality of connection reinforcing openings and a plurality of connection reinforcing projections corresponding thereto as shown in FIG. 1. In other words, the assembled structure includes a plurality of combinations of connection reinforcing opening $3e$ and connection reinforcing projection $2d$. As shown in FIG. 23, one of the connection reinforcing openings shall be referred to as a first connection reinforcing opening, and a connection reinforcing projection to be fitted within the first connection reinforcing opening shall be referred to as a first connection reinforcing projection. The cross sectional view taken along the line XXIV-XXIV in FIG. 23 is shown in FIG. 24.

As described above, assuming one connection reinforcing opening as a first connection reinforcing opening $3e1$, and a portion of resin member 2 fitted within first connection reinforcing opening $3e1$ which is a through hole provided in metal plate 3 as a first connection reinforcing projection $2d1$, then, in the eighth embodiment, a second connection reinforcing opening $3e2$ of an identical planar shape to first connection reinforcing opening $3e1$ is disposed so as to be aligned with first connection reinforcing opening $3e1$ in the longitudinal direction of the shape of first connection reinforcing opening $3e1$ when viewed in a plan view, and a second connection reinforcing projection $2d2$ is fitted into second connection reinforcing opening $3e2$ from the second main surface $3b$ side of metal plate 3 toward the first main surface $3a$ side. The first and second connection reinforcing projections protrude from common resin member 2. More exactly, the first and second connection reinforcing projections protrude from common base portion $2c$.

The eighth embodiment, in which at least two connection reinforcing openings are aligned in the longitudinal direction of the connection reinforcing opening in this manner, can continuously exhibit the effect of preventing detachment by means of the anchor shape. The eighth embodiment, in which the metal plate and the resin member can be joined together not only at a point but along this center line, can prevent detachment more effectively.

In the eighth embodiment, second connection reinforcing opening $3e2$ shall have the identical planar shape to first connection reinforcing opening $3e1$, but they may not be completely identical in planar shape.

(Ninth Embodiment)

Figure 25:
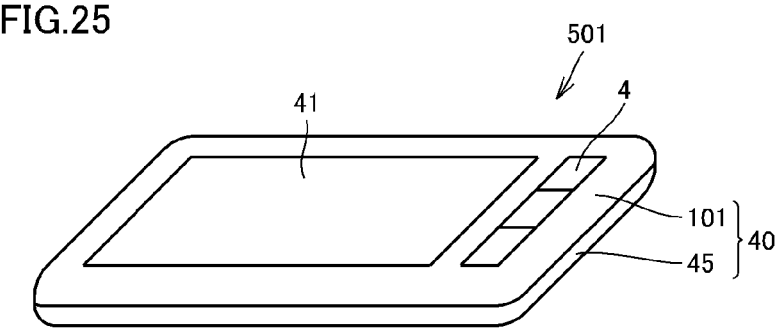
FIG. 25 is a perspective view of an electronic device according to a ninth embodiment based on the present disclosure.
Figure 26:
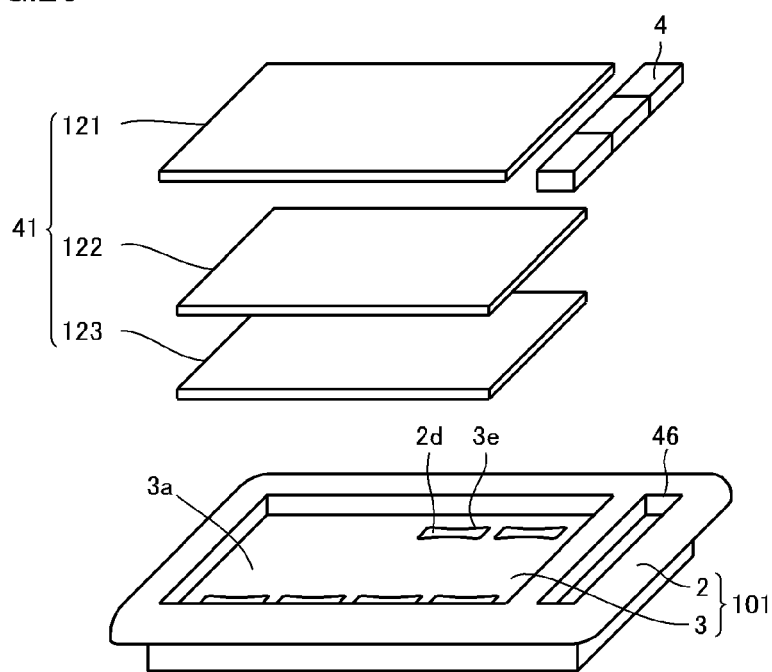
FIG. 26 is an exploded view of the electronic device according to the ninth embodiment based on the present disclosure.
Figure 26:
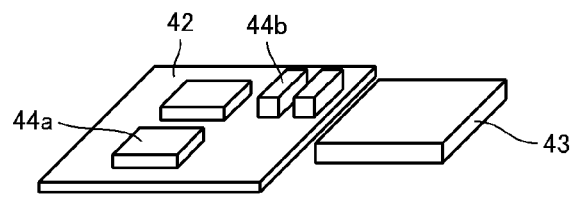
Figure 26:
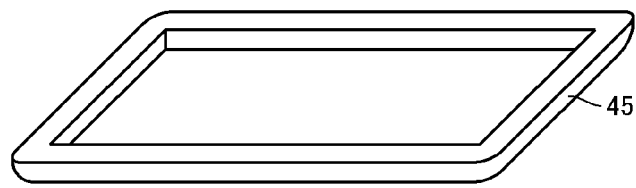

Referring to FIGS. 25 and 26, an electronic device according to a ninth embodiment based on the present disclosure will be described. The electronic device according to the ninth embodiment includes the assembled structure described in any of the above embodiments. An electronic device 501 including assembled structure 101 described in the first embodiment will be described here as an example.

Electronic device 501 according to the ninth embodiment includes assembled structure 101 as a front-side housing component that holds a screen portion 41 as shown in FIG. 25. The front-side housing component implemented by assembled structure 101 and rear-side housing component 45 are assembled together to constitute a housing 40. FIG. 26 shows disassembled electronic device 501.

A recess is provided in the upper surface of assembled structure 101, and screen portion 41 is stacked so as to fit within this recess. Metal plate 3 is disposed at the bottom of the recess in the upper surface of assembled structure 101, and connection reinforcing opening $3e$ provided in metal plate 3 and connection reinforcing projection $2d$ fitted therein are visible. Connection reinforcing projection $2d$ is also a part of resin member 2 similarly to the portion constituting the outermost frame.

A circuit board 42 is disposed under assembled structure 101. Various electronic components $44a$ and $44b$ are arranged on the surface of circuit board 42, and a battery 43 is also arranged thereon. The number, proportion and positional relationship of electronic components $44a$, $44b$ and battery 43 are merely for illustration, and are not limited as such. Rear-side housing component 45 constituting a part of housing 40 is further stacked under circuit board 42. When assembled structure 101 and rear-side housing component 45 are assembled, circuit board 42 is housed there between. Although housing 40 is exposed to the outermost side in FIG. 25, an exterior case (not shown) may be actually provided further on the outside, so that housing 40 may be mostly covered with the exterior case.

In the example shown in FIG. 26, resin member 2 has opening 46 in which button 4 is to be disposed, and button 4 is disposed within opening 46 at the time of assembly. However, button 4 and opening 46 shown here are merely an example, and they are not limited in position, shape, number, and the like as such.

As illustrated in FIG. 26, screen portion 41 includes a cover panel 121 and a display panel 122 disposed on the backside of cover panel 121. Cover panel 121 is a transparent panel. When display panel 122 operates, electronic device 501 can display images and the like. In the example shown in FIG. 26, a touch panel 123 is further disposed on the backside of display panel 122. In this example, screen portion 41 also includes touch panel 123. Display panel 122 and touch panel 123 may be previously applied to cover panel 121. In the example shown in FIG. 26, screen portion 41 indicates cover panel 121 with display panel 122 and touch panel 123 applied to the rear surface thereof. In this case, cover panel 121 also serves to support display panel 122 and touch panel 123. Although in the example shown in FIG. 26, the area of each of display panel 122 and touch panel 123 is smaller than the area of cover panel 121, the large and small relation of the areas shown here is merely an example.

In the case of FIG. 26, cover panel 121, display panel 122 and touch panel 123 are stacked in the order presented, when viewed from the outermost side. Display panel 122 is disposed between touch panel 123 and cover panel 121. However, the order of disposition shown in FIG. 26 is merely an example, and they can be stacked in a different order.

Display panel 122 may be, for example, a liquid crystal display panel, or may be an organic electroluminescence panel. Display panel 122 may be a panel having display functions of types other than that illustrated here. Display panel 122 displays various types of information such as characters, symbols, and figures by being controlled by a control module not shown. Information displayed on display panel 122 becomes visible to a user through cover panel 121.

Touch panel 123 is a projected capacitive type sheet-like touch panel, for example. Touch panel 123 detects contact of an object on screen portion 41, and outputs a detection signal in accordance with the detection result. The control module not shown specifies the details of the operation performed on screen portion 41 based on the detection signal output from touch panel 123, and performs an operation in accordance with the details of the operation.

Although display panel 122 and touch panel 123 are shown as separate panels here, a single panel having both of the functions may be adopted. In the case of using such a display panel with a touch detection function, a display panel with a touch detection function only needs to be disposed on the rear surface of cover panel 121.

Screen portion 41 has a plate-like shape, for example, having a certain longitudinal direction in a plan view. In the example shown in FIGS. 25 and 26, screen portion 41 is rectangular as a whole. Screen portion 41 may have a planar shape as a whole, or may have a curved shape at least in part.

Cover panel 121 is mainly composed of glass, a resin material, a crystalline material, or the like. Examples of the resin material include acrylic resin. Examples of the crystalline material include sapphire. Sapphire herein refers to a single crystal containing alumina ($Al_2O_3$) as the main constituent, and in the present specification, sapphire refers to a single crystal in which the purity of $Al_2O_3$ is more than or equal to about 90%. The purity of $Al_2O_3$ is preferably more than or equal to 99% in that cracking is less likely to occur. Examples of the material of cover panel 121 also include diamond, zirconia, titania, crystal, lithium tantalate, and aluminum oxynitride. Preferably, they are also single crystals having a purity of more than or equal to about 90% in that cracking is less likely to occur. Although the cover panel may be a cover panel made of sapphire alone, it may be a cover panel formed by bonding together a glass panel and a sapphire panel. Hereinafter, a "cover panel made of sapphire" includes not only the cover panel made of sapphire alone, but also the cover panel formed by bonding together a glass panel and a sapphire panel.

In the ninth embodiment, cover panel 121 is shown as a panel of single-layer structure including a layer made of sapphire disposed on the surface of electronic device 501, but may be a composite panel (laminated panel) of multi-layer structure including that layer. For example, cover panel 121 may be a composite panel of two-layer structure composed of a layer made of sapphire (sapphire panel) disposed on the surface of electronic device 501 and a layer made of glass (glass panel) applied to this layer made of sapphire. Cover panel 121 may be a composite panel of three-layer structure composed of a layer made of sapphire (sapphire panel) disposed on the surface of electronic device 501, a layer made of glass (glass panel) applied to this layer made of sapphire, and a layer made of sapphire (sapphire panel) applied to this layer made of glass.

Cover panel 121 may include a layer made of a crystalline material other than sapphire, such as diamond, zirconia, titania, crystal, lithium tantalate, or aluminum oxynitride, for example. Although cover panel 121 deflects integrally with assembled structure 101, the metal plate and the resin member in assembled structure 101 are less likely to be detached in the ninth embodiment as described above. As a result, deflection of cover panel 121 can even be reduced. Although a crystalline material, such as sapphire, among the above-mentioned materials of cover panel 121, may not be able to follow deflection because of its hardness, causing cracking to occur therein, such cracking can be restrained by using above-described assembled structure. When cover panel 121 is mainly made of sapphire, the likelihood of being cracked varies depending on the relation with the orientation of the single-crystal structure of sapphire. For example, the likelihood of being cracked varies between the longitudinal direction and short direction of cover panel 121. Typical plane orientations of sapphire single crystal include the A-plane, C-plane, and R-plane, and the axial orientations include the c-axis, m-axis and a-axis.

Figure 27:
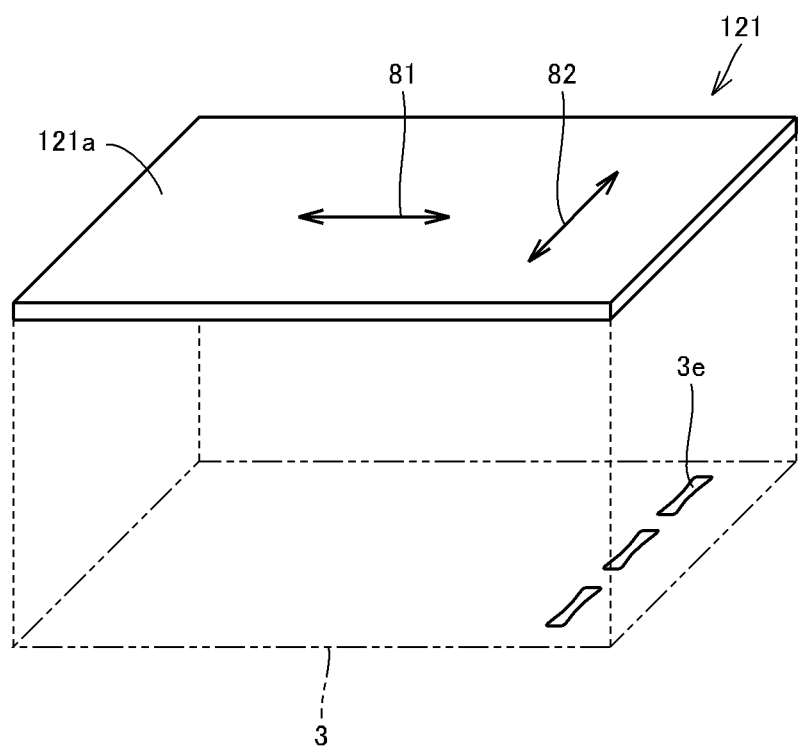
FIG. 27 is an explanatory drawing of a cover panel included in the electronic device according to the ninth embodiment based on the present disclosure.

An example of cover panel 121 is shown in FIG. 27. Cover panel 121 shown here is a cover panel made of sapphire. When a main surface 121a of cover panel 121 is in parallel to the A-plane and a longitudinal direction 81 of cover panel 121 is in parallel to the c-axis, this cover panel 121 is likely to be cracked in longitudinal direction 81. In this case, it is preferable to provide metal plate 3 with connection reinforcing openings 3e located such that their longitudinal direction runs in parallel to a short direction 82 of cover panel 121. Although FIG. 27 shows connection reinforcing openings 3e disposed in short direction 82 of cover panel 121, it is not intended to dispose connection reinforcing openings 3e only in such a direction. Actually, connection reinforcing openings 3e other than those shown in FIG. 27 may also be provided. Connection reinforcing openings 3e may be disposed such that their longitudinal directions run in various directions in metal plate 3, respectively. FIG. 27 representatively depicts, among them, only connection reinforcing openings 3e whose longitudinal direction runs in short direction 82 of cover panel 121 for ease of description. Connection reinforcing openings disposed such that their longitudinal direction run in other directions may be used in combination. For example, connection reinforcing openings are preferably provided such that their longitudinal directions run in correspondence to longitudinal direction 81 and short direction 82 of cover panel 121, respectively.

As another example, when main surface 121a of cover panel 121 which is a cover panel made of sapphire is in parallel to the A-plane and short direction 82 of cover panel 121 is in parallel to the c-axis, cover panel 121 is likely to be cracked in short direction 82. In this case, it is preferable to provide metal plate 3 with connection reinforcing openings 3e located such that their longitudinal direction runs in parallel to longitudinal direction 81 of cover panel 121.

In the electronic device according to the ninth embodiment, it is preferable that top surface 2u of connection reinforcing projection 2d be coplanar with first main surface 3a as shown in FIG. 8, FIG. 9, and the like, and that a panel-like component be disposed adjacent to the first main surface 3a side of metal plate 3 as shown in FIG. 26. Since connection reinforcing projection 2d does not protrude from first main surface 3a by adopting this configuration, the panel-like component can be disposed in close contact with first main surface 3a of metal plate 3, which can contribute to slimming down of the electronic device. Although screen portion 41 is shown in FIG. 26 as an example of the panel-like component, the panel-like component may be other than the screen portion.

Although the example in which a crystalline material, such as sapphire, diamond, zirconia, titania, crystal, lithium tantalate, or aluminum oxynitride, is used for cover panel 121 has been shown as described above, the ninth embodiment is not limited to these examples. These crystalline materials may be used for components other than cover panel 121, for example. For example, when a crystalline material, such as sapphire, diamond, zirconia, titania, crystal, lithium tantalate, or aluminum oxynitride, is used for all of part of rear-side housing component 45, the above-described effect can also be attained by providing connection reinforcing openings in the metal plate of the assembled structure.

As described above, the panel-like component preferably includes a sapphire panel. Since the likelihood that the sapphire panel is cracked can be reduced by adopting this configuration, the effect of connection reinforcing openings provided in the metal plate of the assembled structure can be enjoyed more significantly.

When the panel-like component includes a sapphire panel, the following further holds. The sapphire panel is made of single crystal sapphire, and the sapphire panel has a main surface running in parallel to the A-plane of the single crystal sapphire, and has a longitudinal direction running in parallel to the c-axis of the single crystal sapphire, and the shape of the opening when viewed in a plan view has a longitudinal direction, and the longitudinal direction of the opening is perpendicular to the longitudinal direction of the sapphire panel. By adopting this configuration, the effect of the openings, namely, the connection reinforcing openings, can be enjoyed more significantly, and the likelihood that the sapphire panel is cracked can be reduced.

(Tenth Embodiment)

Figure 28:
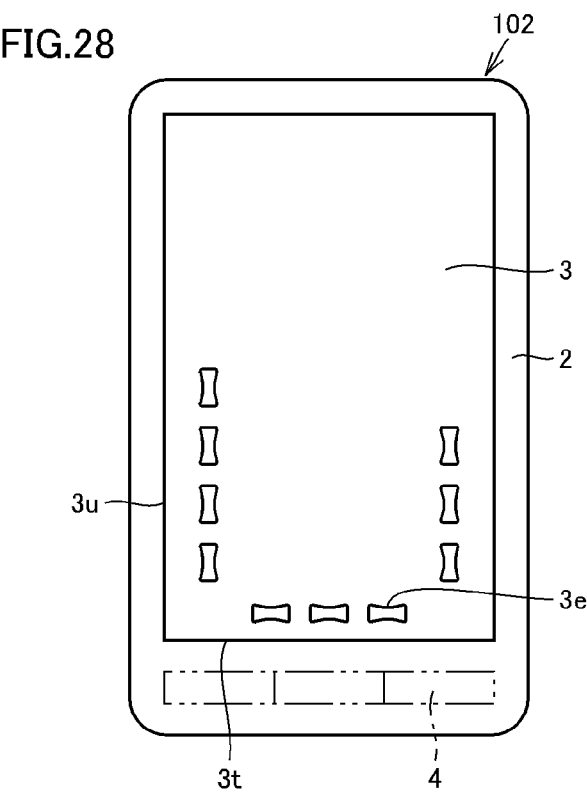
FIG. 28 is a plan view of an assembled structure that an electronic device according to a tenth embodiment based on the present disclosure includes.

Referring to FIG. 28, the electronic device according to a tenth embodiment based on the present disclosure will be described. The electronic device according to the tenth embodiment includes the assembled structure described in any of the above embodiments. An assembled structure 102 included in the electronic device according to the tenth embodiment is shown in FIG. 28. In FIG. 28, an area to be occupied by button 4 when assembled into an electronic device is indicated by the chain double-dashed line.

The electronic device according to the tenth embodiment includes button 4 for a user to operate, and connection reinforcing openings 3e are disposed along a side 3t which is close to button 4 when viewed in a plan view, among the contour sides of metal plate 3 included in assembled structure 102.

As shown in FIG. 28, in assembled structure 102 that the electronic device according to the tenth embodiment includes, plurality of connection reinforcing openings 3e are disposed along sides 3u and 3t, respectively.

Since the side where the button is provided in the electronic device is likely to be pushed strongly by a user, a bending is also likely to occur in the assembled structure constituting a part of the housing. The tenth embodiment, in which connection reinforcing openings 3e are disposed alongside 3t which is close to button 4 when viewed in a plan view, among the contour sides of metal plate 3, can effectively prevent detachment of the assembled structure against a bending that accompanies pressing on the button or its neighborhood.

Figure 29:
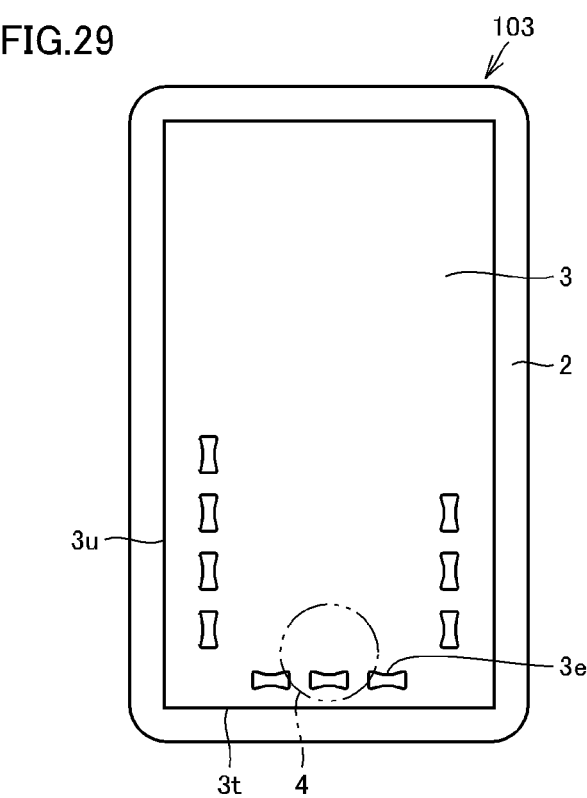
FIG. 29 is a plan view of a variation of the assembled structure that the electronic device according to the tenth embodiment based on the present disclosure includes.

FIG. 28 merely shows an example of disposition of the button. As shown in FIG. 28, it is preferable that the longitudinal direction of button 4 be generally in parallel to that of connection reinforcing openings 3e. In the example shown in FIG. 28, button 4 is located on the outer side relative to the outer edge of metal plate 3 when viewed in a plan view, but it is not limited to such a configuration. As shown in FIG. 29 as another example, button 4 may be located on the inner side relative to the outer edge of metal plate 3. FIG. 29 shows a plan view of an assembled structure 103 that a variation of the electronic device according to the tenth embodiment includes. In the case of the example shown in FIG. 29, the screen portion has an opening for button 4, and button 4 is provided to fit within this opening. Although not shown, it may be configured such that button 4 is provided in the opening in the screen portion, and such that button 4 is located on the outer side relative to the outer edge of metal plate 3. Both in FIGS. 28 and 29, the shape, size, number, position, and the like of button 4 are merely an example, and they are not limited as such.

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. An assembled structure, comprising:
   a metal plate having a first main surface and a second main surface, and having a first through hole; and
   a resin member assembled with the metal plate and disposed on the side of the second main surface, the resin member comprising a first projection that extends outwardly toward the metal plate and fits within the first through hole, wherein
   when the first through hole is viewed in a plan view, the first through hole has a first width and a second width measured in parallel to the first width at a point further away from a center of the through hole, the second width being larger than the first width so as to provide an anchor shape to at least a portion of the first through hole.

2. The assembled structure according to claim 1, wherein the first through hole comprises two opposite sides that flare outwardly in opposite directions away from a center portion of the first through hole.

3. The assembled structure according to claim 1, wherein the metal plate and the resin member are assembled by insert molding.

4. The assembled structure according to claim 1, wherein the metal plate has a rectangular shape having a length in a longitudinal direction when viewed in a plan view, and a shape of the first through hole when viewed in the plan view has a length perpendicular to the first and second widths and parallel to the longitudinal direction of the metal plate.

5. The assembled structure according to claim 1, wherein the first through hole is disposed along and adjacent to an edge of the metal plate, when viewed in a plan view.

6. The assembled structure according to claim 1, further comprising:
   a second through hole having an identical planar shape to the first through hole and disposed to be aligned with the first through hole in a longitudinal direction of the first through hole when viewed in a plan view, and wherein a second projection is fitted within the second through hole from the side of the second main surface toward the side of the first main surface, and the first projection and the second projection protrude from the resin member which is integrally formed with the first and second projections.

7. An electronic device comprising the assembled structure as defined in claim 1.

8. The electronic device according to claim 7, wherein a panel-like component is disposed adjacent to the side of the first main surface of the metal plate.

9. The electronic device according to claim 7, further comprising a button for a user to operate, wherein:
the first through hole is disposed along an edge of the metal plate which is adjacent to the button when viewed in a plan view.

10. The electronic device according to claim 8, wherein the panel-like component comprises a sapphire panel.

11. The electronic device according to claim 10, wherein:
the sapphire panel is made of single crystal sapphire, and the sapphire panel has a main surface in parallel to an A-plane of the single crystal sapphire, and has a length extending in a first longitudinal direction in parallel to a c-axis of the single crystal sapphire, and a shape of the first through hole when viewed in a plan view has a length extending in a second longitudinal direction, and wherein the second longitudinal direction is perpendicular to the first longitudinal direction.

\* \* \* \* \*